US012749175B2

(12) United States Patent
Ohkawa

(10) Patent No.: US 12,749,175 B2
(45) Date of Patent: Sep. 29, 2026

(54) IMAGE PROCESSING APPARATUS, NON-TRANSITORY COMPUTER READABLE MEDIUM STORING IMAGE PROCESSING PROGRAM, AND IMAGE PROCESSING METHOD

(71) Applicant: FUJIFILM Business Innovation Corp., Tokyo (JP)

(72) Inventor: Kazuhiro Ohkawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/188,437

(22) Filed: Mar. 22, 2023

(65) Prior Publication Data

US 2024/0104716 A1 Mar. 28, 2024

(30) Foreign Application Priority Data

Sep. 22, 2022 (JP) ................................ 2022-151795

(51) Int. Cl.
*G06T 7/00* (2017.01)
*H04N 1/00* (2006.01)

(52) U.S. Cl.
CPC ......... *G06T 7/001* (2013.01); *H04N 1/00034* (2013.01)

(58) Field of Classification Search
CPC .......... G06T 7/001; G06T 2207/30144; H04N 1/00034
See application file for complete search history.

(56) References Cited

U.S. PATENT DOCUMENTS

| | | | | |
|---|---|---|---|---|
| 8,477,329 B2 * | 7/2013 | Cok | ...................... | G06F 3/1243 358/1.14 |
| 8,488,163 B2 * | 7/2013 | Cok | ...................... | G06F 3/1243 358/1.14 |

(Continued)

FOREIGN PATENT DOCUMENTS

| | | |
|---|---|---|
| JP | 2005041122 | 2/2005 |
| JP | 2005212162 | 8/2005 |
| JP | 2007310567 | 11/2007 |

OTHER PUBLICATIONS

"Notice of Reasons for Refusal of Japan Counterpart Application", issued on May 19, 2026, with English translation thereof, p. 1-p. 4.

*Primary Examiner* — Aaron W Carter
(74) *Attorney, Agent, or Firm* — JCIPRNET

(57) ABSTRACT

An image processing apparatus includes a processor configured to: specify, as a pre-processing area, a coordinate area in pre-printing scanned image data obtained by scanning a processing medium on which an image is printed or a pattern is applied in advance and on which print image data according to a print request is not printed, the coordinate area including an image corresponding to the image or the pattern; compare post-printing scanned image data obtained by scanning the processing medium on which the print image data is printed with the print image data, and determine that there is a difference between the post-printing scanned image data and the print image data in a case where a comparison result satisfies a determination condition; and set the determination condition for the pre-processing area such that it is difficult to determine that there is a difference between the post-printing scanned image data and the print image data compared to the determination condition for an area other than the pre-processing area.

7 Claims, 10 Drawing Sheets

(56) References Cited

U.S. PATENT DOCUMENTS

| | | | | |
|---|---|---|---|---|
| 9,146,516 | B2 * | 9/2015 | Morishita | G03G 15/55 |
| 2006/0041506 | A1 * | 2/2006 | Mason | G06Q 20/042<br>705/42 |
| 2007/0024876 | A1 * | 2/2007 | Nielsen | G06K 15/025<br>358/1.9 |
| 2008/0278757 | A1 * | 11/2008 | Wong | G06K 15/021<br>358/1.18 |
| 2013/0136314 | A1 * | 5/2013 | Yamakawa | B41J 3/60<br>382/112 |
| 2014/0168709 | A1 * | 6/2014 | Tokumaru | G06T 7/001<br>358/1.18 |
| 2015/0003845 | A1 * | 1/2015 | Morishita | G03G 15/55<br>399/15 |
| 2019/0129660 | A1 * | 5/2019 | Liebelt | G06F 3/1244 |
| 2019/0212955 | A1 * | 7/2019 | Gutierrez | G06K 15/027 |
| 2022/0075576 | A1 * | 3/2022 | Suzuki | H04N 1/00005 |
| 2024/0104716 | A1 * | 3/2024 | Ohkawa | H04N 1/00034 |
| 2025/0014172 | A1 * | 1/2025 | Suzuki | G06T 7/001 |
| 2025/0247475 | A1 * | 7/2025 | Ishikawa | H04N 1/00029 |

* cited by examiner

FIG. 5
PSI
POSTAGE
PAID MAIL
〒 YYY-YYYY
YYY-Y, YY TOWN, YY CITY, YY PREFECTURE
MR./MS. OOOO
〒 xxx-xxxx
xxx-x, xx TOWN, xx CITY, XX PREFECTURE
OOOO Co., Ltd.

IMAGE PROCESSING APPARATUS, NON-TRANSITORY COMPUTER READABLE MEDIUM STORING IMAGE PROCESSING PROGRAM, AND IMAGE PROCESSING METHOD

CROSS-REFERENCE TO RELATED APPLICATIONS

This application is based on and claims priority under 35 USC 119 from Japanese Patent Application No. 2022-151795 filed Sep. 22, 2022.

BACKGROUND

(i) Technical Field

The present invention relates to an image processing apparatus, a non-transitory computer readable medium storing an image processing program, and an image processing method.

(ii) Related Art

In the related art, print image data related to a print request is printed on a processing medium on which an image is printed or a pattern is applied in advance, and the printed processing medium is inspected by comparing scanned image data obtained by scanning the printed processing medium with the print image data. Here, since the print image data does not include an image or a pattern applied in advance on the processing medium, an appropriate inspection cannot be performed by simply comparing the scanned image data with the print image data. Therefore, in the related art, it has been devised so that an appropriate inspection can be performed by comparing scanned image data with print image data.

For example, JP2007-310567A discloses an inspection system that prints print image data related to a print request on pre-printed paper on which an image is printed in advance, and collates the print image data with image data obtained by scanning a printed print document, in which the inspection system sets an enable area to be inspected based on the print image data, extracts an image included in the enable area (that is, only a printed image), and performs collation.

Further, JP2005-212162A discloses a print inspection apparatus that assigns a code image indicating a type of pre-printed paper on which a pre-printed image is printed to print image data related to a print request, obtains a mask image based on the code image, masks the pre-printed image based on the mask image, and then compares an output image (an image obtained by scanning a medium in which print image data is printed on pre-printed paper) with the print image data.

Further, JP2005-041122A discloses a printed matter inspection apparatus that scans a printed matter on which reference image data is printed on a print medium (pre-printed paper) on which preliminary image data is printed to acquire inspection image data, determines an abnormality of the pre-printed paper by subtracting the inspection image data from the preliminary image data, subtracts the preliminary image data from the inspection image data to obtain a second difference image, and subtracts the second difference image from the reference image data to inspect the printed matter.

SUMMARY

In printing print image data related to a print request on a processing medium on which an image is printed or a pattern is applied in advance, and comparing scanned image data obtained by scanning the printed processing medium with the print image data, it is conceivable to set only the periphery of an image (text, images, etc.) included in the print image data as an inspection target area. However, in this case, it becomes impossible to inspect a portion other than the periphery of the image included in the print image data. For example, it is not possible to detect a stain or the like attached to a portion other than the periphery of the image included in the print image data.

Therefore, for example, it is advisable to specify the position of the image printed in advance on the processing medium or the position of the pattern applied in advance on the processing medium (hereinafter, these are collectively referred to as a "pre-processing area") and then compare the scanned image data with the print image data in consideration of the specified pre-processing area.

Here, with respect to an apparatus that compares the scanned image data with the print image data, it is conceivable to provide data indicating a pre-processing area to the apparatus. However, in a case where data indicating a pre-processing area is provided to the apparatus, problems such as the need for time and labor may arise.

For example, a method of providing data indicating a position of the pre-processing area to the print image data is conceivable. However, in this method, it is necessary to process the print image data, which is troublesome. Further, for example, a method of providing pre-print image data or the like in a case where pre-printing is performed to create a processing medium to the inspection apparatus as data indicating a position of the pre-processing area is also conceivable. However, there may be cases where the inspection apparatus cannot acquire such data. Further, a method of designating pre-processing areas one by one by the user is also conceivable, but even with this method, there may be a problem that the user takes time and labor.

Aspects of non-limiting embodiments of the present disclosure relate to an image processing apparatus, a non-transitory computer readable medium storing an image processing program, and an image processing method that make it possible to specify a pre-processing area without depending on given data indicating a position of the pre-processing area in printing print image data related to a print request on a processing medium on which an image is printed or a pattern is applied in advance, and comparing scanned image data obtained by scanning the printed processing medium with the print image data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to: specify, as a pre-processing area, a coordinate area in pre-printing scanned image data obtained by scanning a processing medium on which an image is printed or a pattern is applied in advance and on which print image data according to a print request is not printed, the coordinate area including an image corresponding to the image or the pattern; compare post-printing scanned image data obtained by scanning the processing medium on which the print image data is printed with the print image data, and determine that there is a difference between the post-printing scanned image data and the print image data in a case where a comparison result satisfies a determination condition; and set the determination condition for the pre-processing area such that it is difficult to determine that there is a difference between the post-printing scanned image data and the print image data compared to the determination condition for an area other than the pre-processing area.

BRIEF DESCRIPTION OF THE DRAWINGS

Exemplary embodiment(s) of the present invention will be described in detail based on the following figures, wherein.

DETAILED DESCRIPTION

Figure 1:
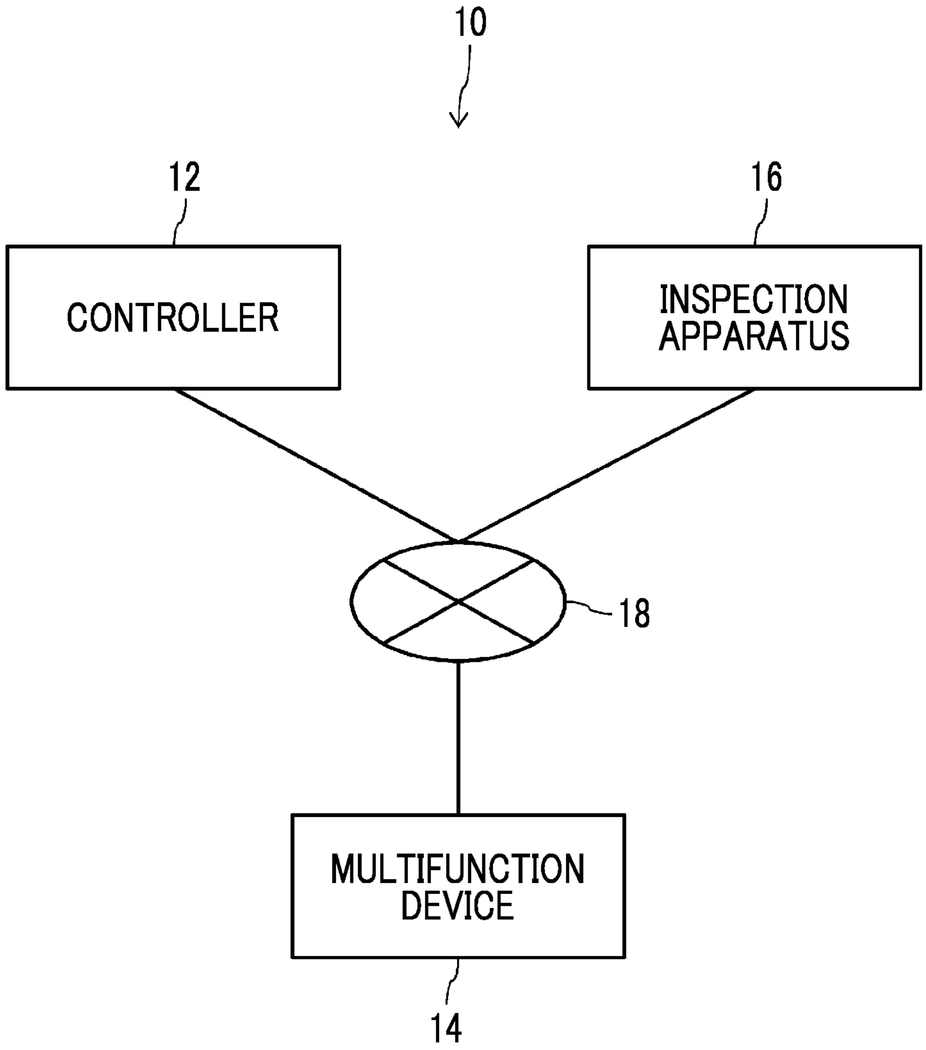
FIG. 1 is a schematic configuration diagram of an inspection system according to the present exemplary embodiment.

FIG. 1 is a schematic configuration diagram of an inspection system 10 according to the present exemplary embodiment. The inspection system 10 includes a controller 12, a multifunction device 14, and an inspection apparatus 16 as an image processing apparatus. The controller 12, the multifunction device 14, and the inspection apparatus 16 are connected to each other so as to be able to communicate with each other via a communication line 18 such as a local area network (LAN) or a wide area network (WAN).

The inspection system 10 is a system that prints print image data related to a print job as a print request on a print medium such as paper, optically scans a print medium on which the print image data is printed, obtains scanned image data, compares the print image data with the scanned image data, and detects a difference between the print image data and the scanned image data. Accordingly, defects in the print medium on which the print image data is printed are detected. In particular, as will be described in detail later, in the present exemplary embodiment, the print image data is printed on a print medium on which an image is printed or a pattern is applied in advance (in the present specification, this is referred to as a "processing medium").

The controller 12 is configured of, for example, a computer. The controller 12 includes a communication interface for communicating with the multifunction device 14 and the inspection apparatus 16 via the communication line 18, a display, an input interface for a user to input instructions, a memory for storing data, a processor for executing each process, and the like.

The controller 12 receives a print job for causing the multifunction device 14 to execute the print process from a user terminal (not shown) used by the user. The controller 12 executes a rasterization process based on a print job, and converts a data format of print image data for which printing is instructed in the print job into a raster format (for example, a bitmap format) that can be recognized by the multifunction device 14. The controller 12 transmits the print image data in the raster format to the multifunction device 14 and the inspection apparatus 16.

The multifunction device 14 is configured of a communication interface for communicating with the controller 12 and the inspection apparatus 16 via the communication line 18, a printing device, a scanning device, and the like. The printing device is configured of a charging roller, a photosensitive drum, a transfer roller, a fixing roller, a pressure roller, a toner, a medium transport mechanism for transporting a print medium, and the like. The scanning device is configured of a light source, an image sensor, and the like.

The multifunction device 14 executes a print process of printing the print image data related to the print job on a print medium (particularly, a processing medium in the present exemplary embodiment), a scanning process of optically scanning the processing medium on which the print image data is printed to generate scanned image data, and the like.

The multifunction device 14 prints the print image data received from the controller 12 on a processing medium, optically scans the processing medium on which the print image data is printed with a scanner device, and acquires scanned image data representing the processing medium. The multifunction device 14 transmits the scanned image data to the inspection apparatus 16.

In particular, in the present exemplary embodiment, the multifunction device 14 acquires scanned image data obtained by scanning a processing medium on which print image data according to a print job is not printed and scanned image data obtained by scanning a processing medium on which print image data according to a print job is printed, and transmits the acquired scanned image data to the inspection apparatus 16. In the present specification, the scanned image data obtained by scanning a processing medium on which the print image data is not printed is referred to as pre-printing scanned image data, and the scanned image data obtained by scanning a processing medium on which the print image data is printed is referred to as post-printing scanned image data. In addition, in a case where the pre-printing scanned image data and the post-printing scanned image data are not distinguished, these are collectively referred to simply as scanned image data.

For example, in a case where the multifunction device 14 receives a print command together with the print image data from the controller 12, first, the multifunction device 14 transports the processing medium without printing the print image data and causes the scanning device to scan the processing medium. Thereby, pre-printing scanned image data is acquired. The multifunction device 14 may acquire a plurality of pieces of pre-printing scanned image data corresponding to a plurality of processing media of the same type by transporting a plurality of processing media of the same type and causing the scanning device to scan the plurality of processing media of the same type. After that, the multifunction device 14 transports the processing medium on which the print image data is printed and causes the scanning device to scan the processing medium. Thereby, post-printing scanned image data is acquired. By performing such a process, the multifunction device 14 can continuously acquire the pre-printing scanned image data and the post-printing scanned image data. The method of acquiring the pre-printing scanned image data and the post-printing scanned image data is not limited thereto.

Figure 2:
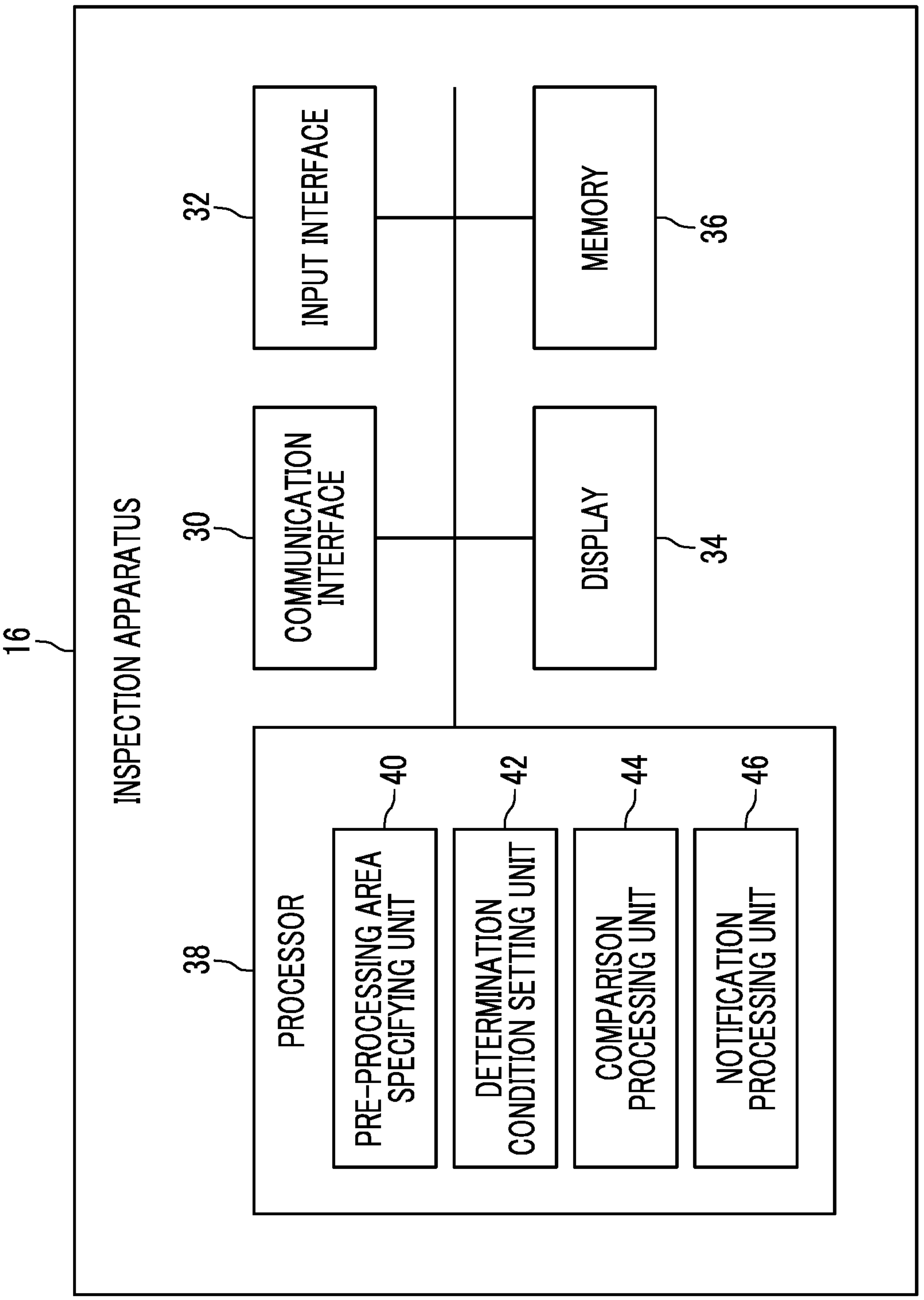
FIG. 2 is a schematic configuration diagram of an inspection apparatus.

FIG. 2 is a schematic configuration diagram of the inspection apparatus 16. The inspection apparatus 16 is configured of, for example, a server computer, and may be any apparatus as long as the functions described below can be exhibited.

A communication interface 30 includes, for example, a network adapter. The communication interface 30 exhibits a function of communicating with the controller 12 and the multifunction device 14 via the communication line 18. The communication interface 30 receives print image data from the controller 12 and receives scanned image data from the multifunction device 14.

An input interface 32 is configured of, for example, a mouse, a keyboard, or a touch panel. The input interface 32 is used for the user to input various commands to the inspection apparatus 16.

A display 34 is configured of, for example, a liquid crystal panel, an organic electro luminescence (EL), or the like. Various screens are displayed on the display 34 by a processor 38 to be described later.

A memory 36 includes, for example, a hard disk drive (HDD), a solid state drive (SSD), a read only memory (ROM), or a random access memory (RAM). The memory 36 may be provided separately from the processor 38 to be described later, or at least a part thereof may be provided inside the processor 38. An image processing program for operating each part of the inspection apparatus 16 is stored in the memory 36. The image processing program may also be stored in a non-transitory computer readable storage medium such as a Universal Serial Bus (USB) memory or a CD-ROM, for example. The inspection apparatus 16 can scan and execute the image processing program from such a storage medium.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Figure 3:
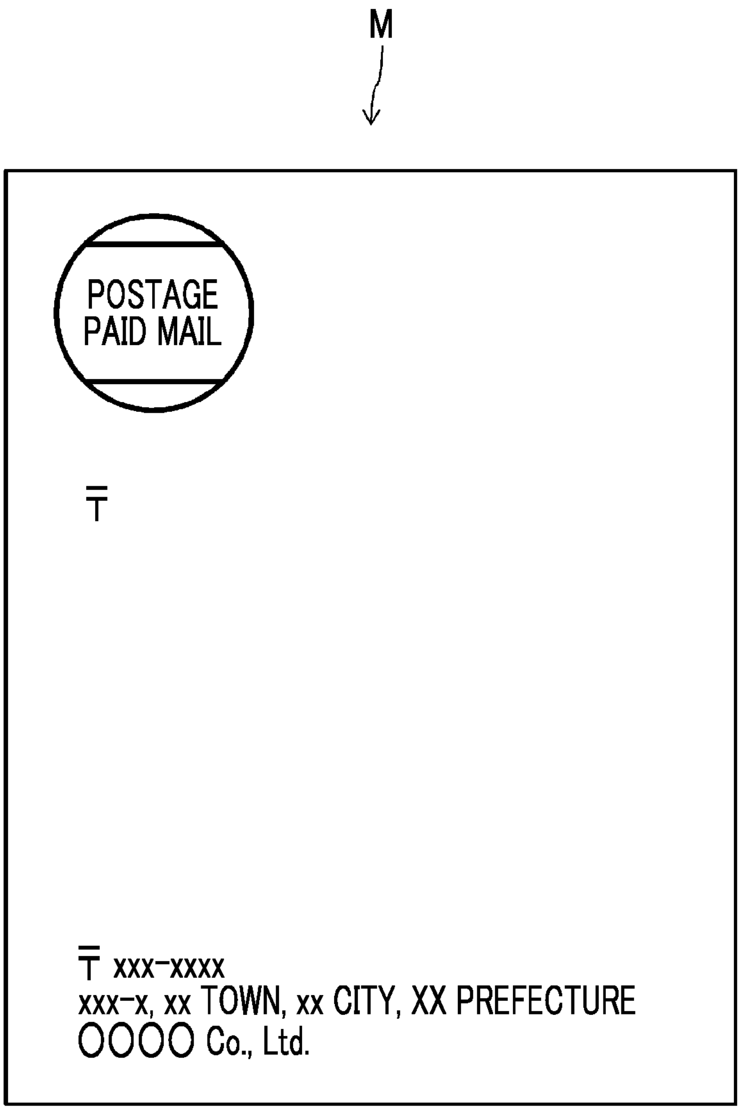
FIG. 3 is a diagram showing an example of a processing medium.
Figure 4:
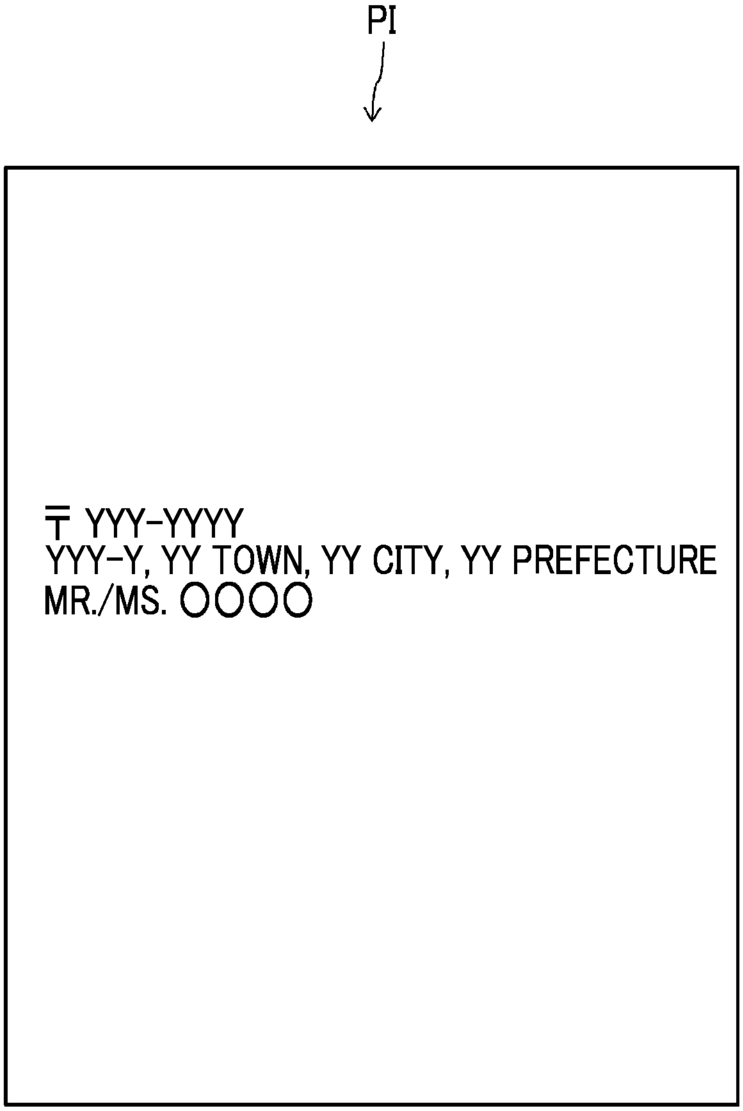
FIG. 4 is a diagram showing an example of print image data.
Figure 5:
FIG. 5 is a diagram showing an example of post-printing scanned image data.

As shown in FIG. 1, the processor 38 exhibits functions as a pre-processing area specifying unit 40, a determination condition setting unit 42, a comparison processing unit 44, and a notification processing unit 46 by means of the image processing program stored in the memory 36. As described above, in the present exemplary embodiment, the multifunction device 14 prints print image data on the processing medium. FIG. 3 shows an example of a processing medium M, FIG. 4 shows an example of print image data PI, and FIG. 5 shows an example of post-printing scanned image data PSI. Since the print image data PI does not include an image printed in advance or a pattern applied in advance on the processing medium M, an appropriate inspection cannot be performed by simply comparing the print image data PI with the post-printing scanned image data PSI. Therefore, in the present exemplary embodiment, the respective functions of the processor 38 achieve an appropriate inspection by comparing the print image data PI with the post-printing scanned image data PSI.

The pre-processing area specifying unit 40 specifies, as pre-processing areas", coordinate areas including an image corresponding to an image printed in advance on the processing medium M or an image corresponding to a pattern applied in advance on the processing medium M in the pre-printing scanned image data received from the multifunction device 14 (in the present specification, these are referred to as "pre-processed images").

Figure 6:
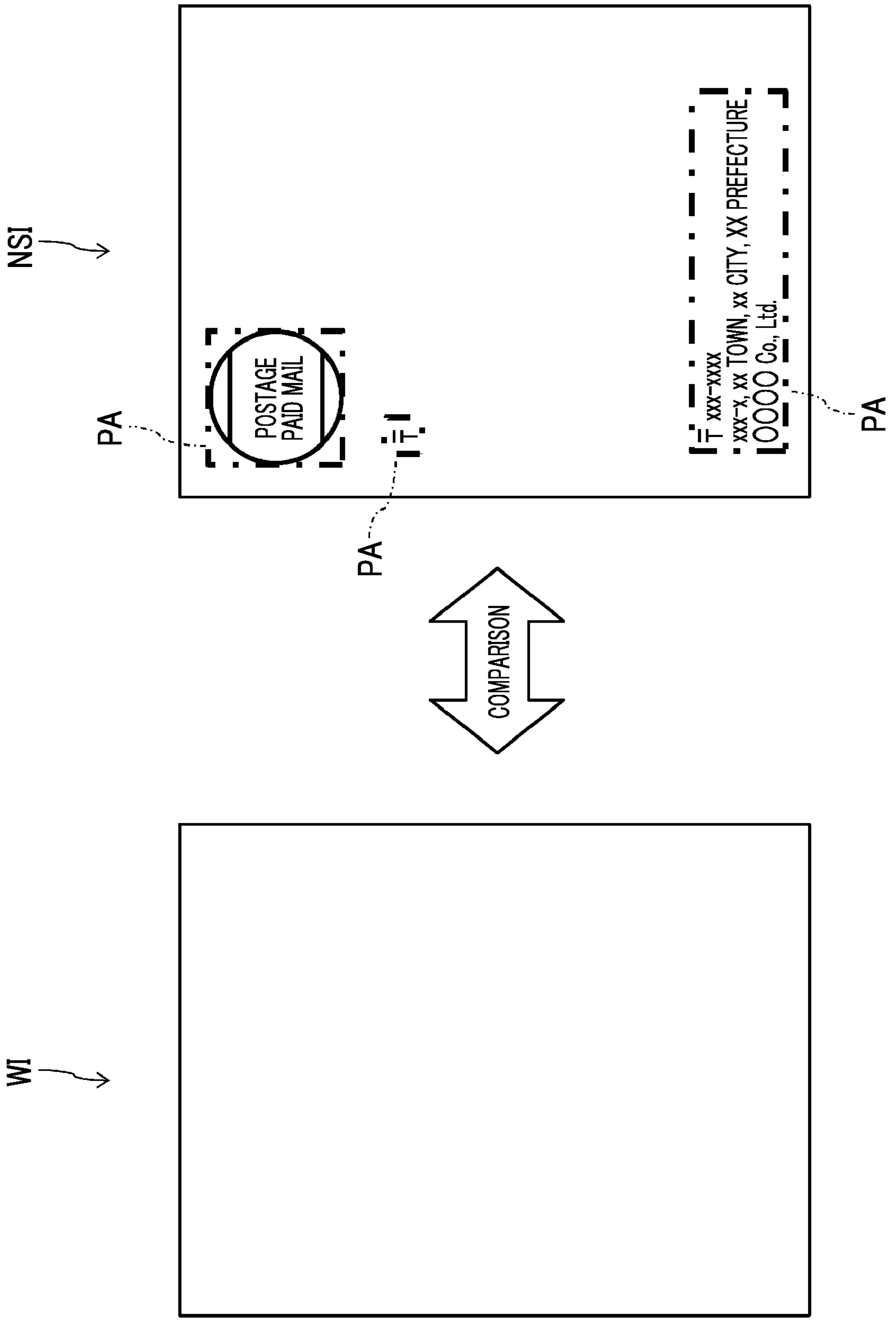
FIG. 6 is a conceptual diagram showing a processing content of a pre-processing area specifying unit.

FIG. 6 is a conceptual diagram showing a processing content of the pre-processing area specifying unit 40. In the present exemplary embodiment, the pre-processing area specifying unit 40 compares blank image data WI that does not include any image with pre-printing scanned image data NSI, and specifies the coordinate area including pixels determined to have a difference as a pre-processing area PA. Needless to say, a pixel group determined to have a difference is a pixel group corresponding to the pre-processed image. The blank image data WI may be stored in the memory 36 in advance.

Specifically, the pre-processing area specifying unit 40 compares pixel values (for example, RGB values) for each corresponding pixel between the blank image data WI and the pre-printing scanned image data NSI. In a case where the difference between the pixel values is less than a predetermined threshold value as a result of the comparison, the pre-processing area specifying unit 40 determines that there is no difference between the pixels, in a case where the difference between the pixel values is equal to or greater than the predetermined threshold value as a result of the comparison, the pre-processing area specifying unit 40 determines that there is a difference between the pixels. The threshold value may be appropriately decided by an administrator of the inspection apparatus 16 or the like.

The pre-processing area specifying unit 40 can set the circumscribing rectangle of the pixel group determined to have a difference as the pre-processing area PA. Further, in consideration of the deviation of the position of the pre-processed image in the pre-printing scanned image data NSI that may occur during the scanning process of the multifunction device 14, the pre-processing area specifying unit 40 may set a rectangular area obtained by extending the circumscribing rectangle of the pixel group determined to have a difference by several pixels vertically and horizontally as the pre-processing area PA.

Further, in a case where the multifunction device 14 acquires a plurality of pieces of pre-printing scanned image data NSI for the plurality of processing media M of the same type, the pre-processing area specifying unit 40 may specify a coordinate area including a pre-processed image as a temporary pre-processing area for each of the plurality of pieces of pre-printing scanned image data NSI corresponding to the plurality of processing media M of the same type, and specify the pre-processing area PA based on a plurality of temporary pre-processing areas specified in the plurality of pieces of pre-printing scanned image data NSI.

Figure 7:
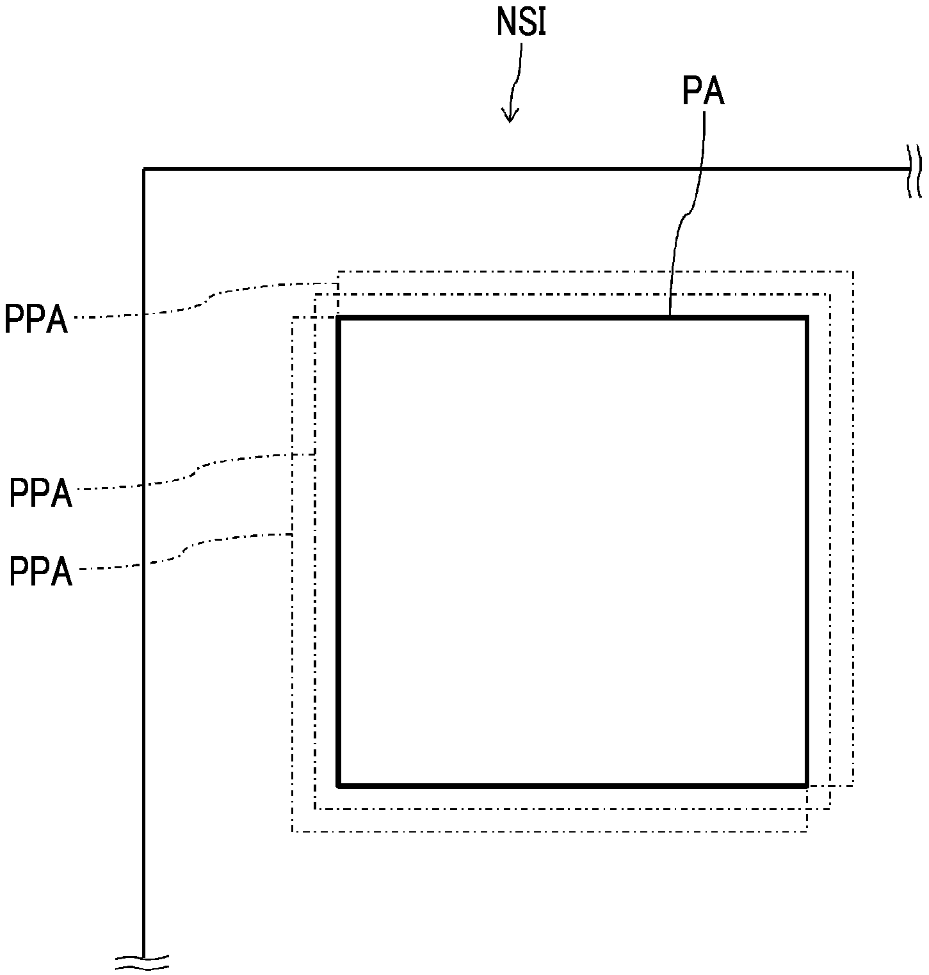
FIG. 7 is a first diagram showing a pre-processing area specified based on a plurality of temporary pre-processing areas.

FIG. 7 is a first diagram showing a pre-processing area PA specified based on a plurality of temporary pre-processing areas PPA. In FIG. 7 (and FIG. 8 to be described later), the three areas indicated by the one-dot chain line represent the three temporary pre-processing areas PPA, and the area indicated by the solid line represent the pre-processing area PA. For example, as shown in FIG. 7, the pre-processing area specifying unit 40 may specify, as the pre-processing area PA, a coordinate area included in any of the plurality of temporary pre-processing areas PPA specified for each of the plurality of pieces of pre-printing scanned image data NSI corresponding to the plurality of processing media M of the same type. Accordingly, in a case where one of the processing media has a defect, for example, in a case where the processing medium is dirty, it is possible to prevent the pre-processing area PA from being set in an area that does not include the pre-processed image.

Figure 8:
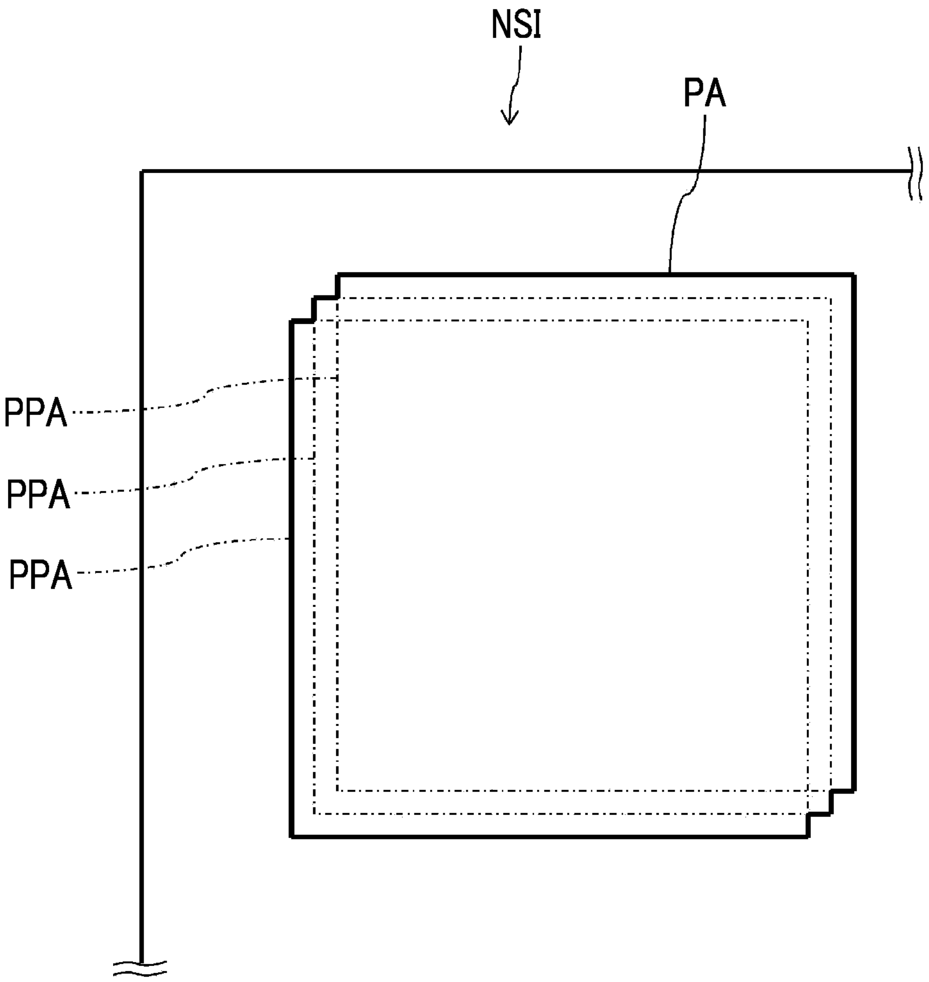
FIG. 8 is a second diagram showing a pre-processing area specified based on a plurality of temporary pre-processing areas.

FIG. 8 is a second diagram showing a pre-processing area PA specified based on a plurality of temporary pre-processing areas PPA. For example, as shown in FIG. 8, the pre-processing area specifying unit 40 may specify, as the pre-processing area PA, a coordinate area included in the temporary pre-processing area PPA a predetermined number of times or more in specifying the temporary pre-processing area PPA a plurality of times for the plurality of pieces of pre-printing scanned image data NSI corresponding to the plurality of processing media M of the same type. The example of FIG. 8 is an example in which the predetermined number of times is set to one, and in this case, the coordinate area included in any of the plurality of temporary pre-processing areas PPA is specified as the pre-processing area PA. The predetermined number of times does not have to be one, and is set in advance by an administrator of the inspection apparatus 16 or the like. Accordingly, the pre-processing area PA can be set in consideration of the deviation of the position of the pre-processed image in the pre-printing scanned image data NSI that may occur during the scanning process of the multifunction device 14.

For example, the pre-processing area specifying unit 40 may store information representing the pre-processing area PA specified as described above in the memory 36. Accordingly, the user can perform an inspection (details will be described later) for detecting a difference between the print image data and the post-printing scanned image data by reusing the pre-processing area PA specified in the past.

For example, more advisably, the pre-processing area specifying unit 40 may assign a medium identifier that identifies the type of the processing medium M to the processing medium M, and store the medium identifier of the processing medium M and information representing the pre-processing area PA related to the type of the processing medium M in the memory 36 in association with each other. Accordingly, by selecting the type of the processing medium M, the user can reuse the appropriate pre-processing area PA for the processing medium M to be inspected from now on.

The determination condition setting unit 42 sets a determination condition for determining that there is a difference between the post-printing scanned image data PSI and the print image data PI in a case where the comparison processing unit 44 to be described later compares the post-printing scanned image data PSI (see FIG. 5) with the print image data PI (see FIG. 4). For example, in a case where the comparison processing unit 44 compares the pixel values for each corresponding pixel between the post-printing scanned image data PSI and the print image data PI, and determines that there is no difference in the pixel in a case where the difference between the pixel values is less than a threshold value, the determination condition setting unit 42 sets the threshold value.

In particular, the determination condition setting unit 42 sets a determination condition for the pre-processing area PA specified by the pre-processing area specifying unit 40 such that it is difficult to determine that there is a difference between the post-printing scanned image data PSI and the print image data PI compared to determination conditions for areas other than the pre-processing area PA (referred to as "non-processing areas" in the present specification).

For example, the comparison processing unit 44 compares the pixel values for each corresponding pixel between the post-printing scanned image data PSI and the print image data PI, and determines that there is no difference in the pixel in a case where the difference between the pixel values is less than a threshold value, the determination condition setting unit 42 sets the threshold value for the pre-processing area PA to a value larger than the threshold value for the non-processing area. The determination condition setting unit 42 may set the pre-processing area PA to be excluded from the target of the comparison process in the comparison processing unit 44 (for example, set the threshold value of the pre-processing area PA to infinity).

In a case where the user designates the pre-processing area PA stored in the memory 36, the determination condition setting unit 42 sets a determination condition for the pre-processing area PA designated by the user such that it is difficult to determine that there is a difference between the post-printing scanned image data PSI and the print image data PI compared to a determination condition for the non-processing area.

Further, in a case where the medium identifier of the processing medium M and the information representing the pre-processing area PA related to the type of the processing medium M are stored in the memory 36 in association with each other, and the user designates the type of the processing medium M, the determination condition setting unit 42 specifies the pre-processing area PA corresponding to the type of the processing medium M designated by the user, and sets the determination condition for the specified pre-processing area PA such that it is difficult to determine that there is a difference between the post-printing scanned image data PSI and the print image data PI compared to the determination condition for the non-processing area.

Figure 9:
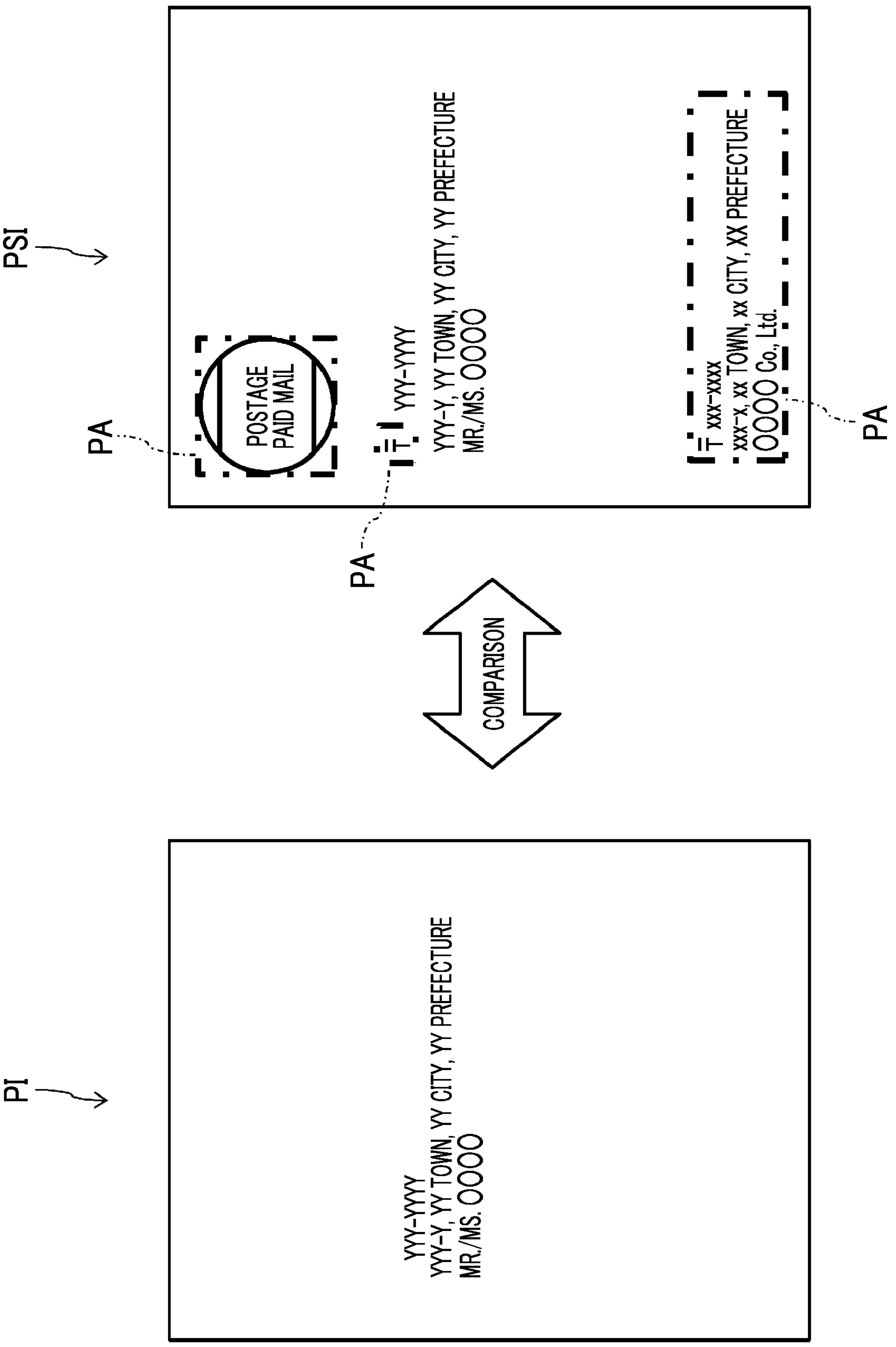
FIG. 9 is a conceptual diagram showing a processing content of the comparison processing unit.

FIG. 9 is a conceptual diagram showing a processing content of the comparison processing unit 44. The comparison processing unit 44 compares the post-printing scanned image data PSI with the print image data PI, and determines that there is a difference between the post-printing scanned image data PSI and the print image data PI in a case where the comparison result satisfies the determination condition set by the determination condition setting unit 42. In other words, the comparison processing unit 44 determines that there is no difference between the post-printing scanned image data PSI and the print image data PI in a case where the comparison result does not satisfy the determination condition set by the determination condition setting unit 42.

In particular, in a case where the determination condition setting unit 42 sets the pre-processing area PA to be excluded from the target of the comparison process, the comparison processing unit 44 excludes the pre-processing area PA and determines the difference between the post-printing scanned image data PSI and the print image data PI only for the non-processing area.

Accordingly, since the comparison processing unit 44 does not consider the pre-processing area PA including the pre-processed image much (or does not consider the pre-processing area PA including the pre-processed image at all) in the comparison process even though there is originally a difference in a portion of the pre-processed image between the post-printing scanned image data PSI and the print image data PI, it is possible to determine the true difference between the post-printing scanned image data PSI and the print image data PI.

The notification processing unit 46 notifies the user of the determination result of the comparison processing unit 44. For example, the notification processing unit 46 causes the determination result to be displayed on the display 34, a display of a user terminal, or the like.

The processes in the pre-processing area specifying unit 40 and the determination condition setting unit 42 may be performed immediately, for example, after the inspection apparatus 16 receives the pre-printing scanned image data NSI, or after the user designates the pre-processing area PA. In addition, each process in the comparison processing unit 44 and the notification processing unit 46 may be performed immediately after receiving, for example, the post-printing scanned image data PSI and the print image data PI. In other words, the inspection process by the processor 38 may be executed, for example, in real time as the print process of the print job. Accordingly, in a case where the post-printing scanned image data PSI is determined to be defective by the inspection process, the user can immediately execute the print process related to the print image data again.

Figure 10:
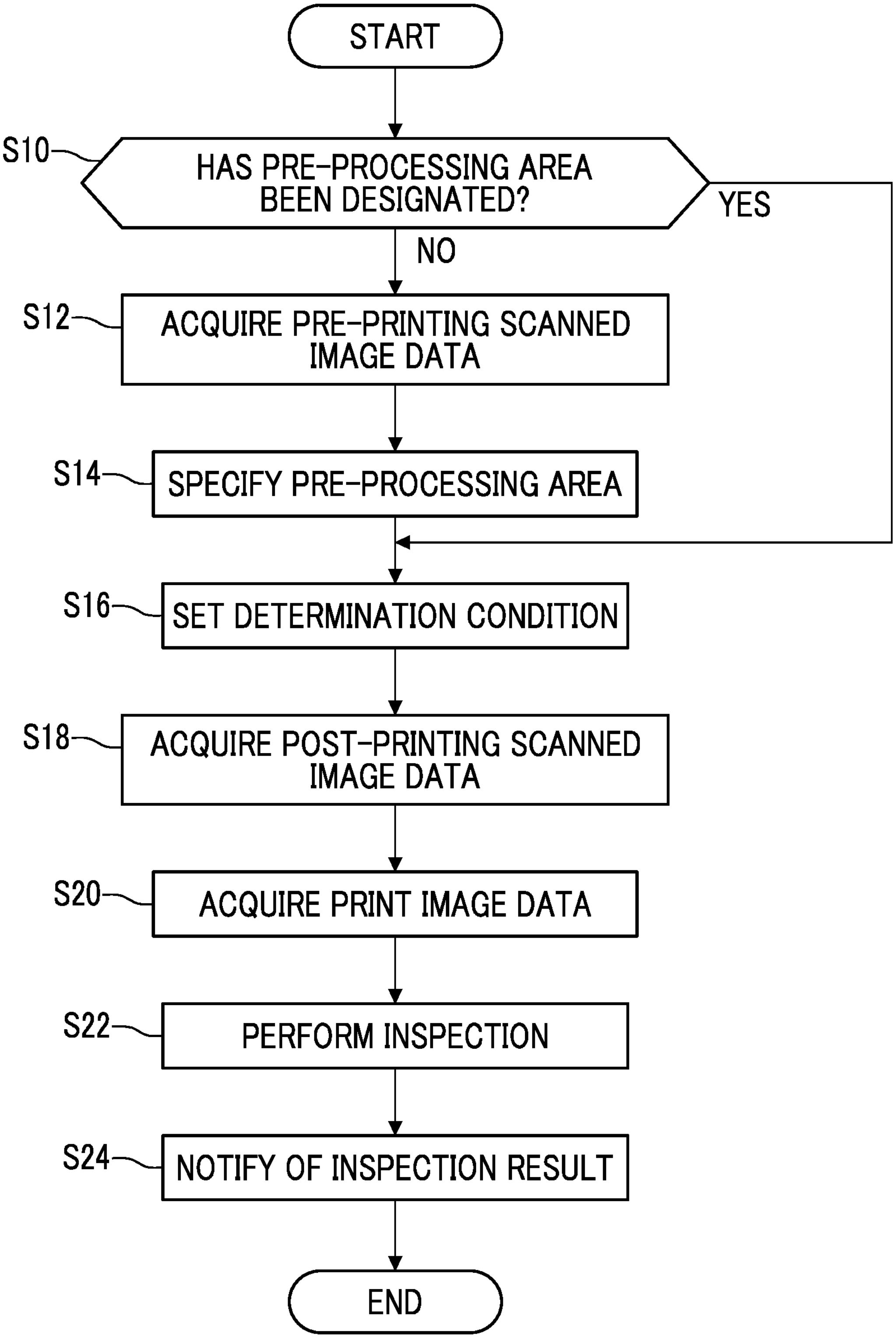
FIG. 10 is a flowchart showing a processing flow of the inspection apparatus according to the present exemplary embodiment.

The outline of the inspection apparatus 16 according to the present exemplary embodiment is as described above. Hereinafter, the processing flow of the inspection apparatus 16 will be described with reference to the flowchart shown in FIG. 10.

In step S10, the processor 38 determines whether or not the user has designated the pre-processing area PA stored in the memory 36. In a case where the user has not designated the pre-processing area PA, the process proceeds to step S12, and in a case where the user has designated the pre-processing area PA, the processes of steps S12 to S14 are bypassed and the process proceeds to step S16.

In step S12, the inspection apparatus 16 receives the pre-printing scanned image data NSI (see FIG. 6) from the multifunction device 14.

In step S14, the pre-processing area specifying unit 40 compares the blank image data WI with the pre-printing scanned image data NSI acquired in step S12, and specifies a coordinate area including pixels determined to have a difference as the pre-processing area PA.

In step S16, the determination condition setting unit 42 sets the determination condition for the pre-processing area PA specified in step S14 or designated by the user in step S10 such that it is difficult to determine that there is a difference between the post-printing scanned image data PSI and the print image data PI compared to the determination condition for the non-processing area.

In step S18, the inspection apparatus 16 receives the post-printing scanned image data PSI (see FIG. 5 or FIG. 9) from the multifunction device 14.

In step S20, the inspection apparatus 16 receives the print image data PI (see FIG. 4 or FIG. 9) from the controller 12.

In step S22, the comparison processing unit 44 compares the post-printing scanned image data PSI acquired in step S18 with the print image data PI acquired in step S20, and determines that there is a difference between the post-printing scanned image data PSI and the print image data PI in a case where the comparison result satisfies the determination condition set in step S16.

In step S24, the notification processing unit 46 notifies the user of the determination result by the comparison processing unit 44 in step S22.

Although the exemplary embodiment according to the present invention has been described above, the present invention is not limited to the above-described exemplary embodiment, and various modifications can be made without departing from the spirit of the present invention.

For example, in the present exemplary embodiment, the inspection apparatus 16 has the functions of the pre-processing area specifying unit 40, the determination condition setting unit 42, the comparison processing unit 44, and the notification processing unit 46, but these functions may be provided in the controller 12 or the multifunction device 14.

Supplementary Note (((1)))

An image processing apparatus comprising:

a processor configured to:

specify, as a pre-processing area, a coordinate area in pre-printing scanned image data obtained by scanning a processing medium on which an image is printed or a pattern is applied in advance and on which print image data according to a print request is not printed, the coordinate area including an image corresponding to the image or the pattern;

compare post-printing scanned image data obtained by scanning the processing medium on which the print image data is printed with the print image data, and determine that there is a difference between the post-printing scanned image data and the print image data in a case where a comparison result satisfies a determination condition; and set the determination condition for the pre-processing area such that it is difficult to determine that there is a difference between the post-printing scanned image data and the print image data compared to the determination condition for an area other than the pre-processing area.

(((2)))

The image processing apparatus according to (((1))), wherein the processor is configured to: determine a difference between the post-printing scanned image data and the print image data, excluding the pre-processing area.

(((3)))

The image processing apparatus according to (((1))) or (((2))), wherein the processor is configured to:

store information representing the specified pre-processing area in a memory; and set the determination condition for the pre-processing area designated by a user such that it is difficult to determine that there is a difference between the post-printing scanned image data and the print image data compared to the determination condition for the area other than the pre-processing area.

(((4)))

The image processing apparatus according to (((3))), wherein the processor is configured to:

store a medium identifier that identifies a type of the processing medium and information representing the pre-processing area related to the type of the processing medium in a memory in association with each other; and set the determination condition for the pre-processing area corresponding to the type of the processing medium designated by the user such that it is difficult to determine that there is a difference between the post-printing scanned image data and the print image data compared to the determination condition for the area other than the pre-processing area.

(((5)))

The image processing apparatus according to (((1))), wherein the processor is configured to:

specify a coordinate area including an image corresponding to the image or the pattern as a temporary pre-processing area for each of a plurality of pieces of the pre-printing scanned image data corresponding to a plurality of processing media of the same type; and specify the pre-processing area based on a plurality of temporary pre-processing areas specified in the plurality of pieces of pre-printing scanned image data.

(((6)))

The image processing apparatus according to (((5))), wherein the processor is configured to: specify a coordinate area included in any of the plurality of specified temporary pre-processing areas as the pre-processing area.

(((7)))

The image processing apparatus according to (((5))), wherein the processor is configured to: specify, as the pre-processing area, a coordinate area included in the temporary pre-processing area a predetermined number of times or more in specifying the temporary pre-processing area a plurality of times for the plurality of pieces of pre-printing scanned image data.

(((8)))

An image processing program causing a computer to execute a process comprising:

specifying, as a pre-processing area, a coordinate area in pre-printing scanned image data obtained by scanning a processing medium on which an image is printed or a pattern is applied in advance and on which print image data according to a print request is not printed, the coordinate area including an image corresponding to the image or the pattern;

comparing post-printing scanned image data obtained by scanning the processing medium on which the print image data is printed with the print image data, and determining that there is a difference between the post-printing scanned image data and the print image data in a case where a comparison result satisfies a determination condition; and setting the determination condition for the pre-processing area such that it is difficult to determine that there is a difference between the post-printing scanned image data and the print image data compared to the determination condition for an area other than the pre-processing area.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a processor configured to:

specify, as a pre-processing area, a coordinate area in pre-printing scanned image data obtained by scanning a processing medium on which an image is printed or a pattern is applied in advance and on which print image data according to a print request is not printed, the coordinate area including an image corresponding to the image or the pattern;

compare post-printing scanned image data obtained by scanning the processing medium on which the print image data is printed with the print image data, and determine that there is a difference between the post-printing scanned image data and the print image data in a case where a comparison result satisfies a determination condition, wherein a determination condition for the pre-processing area is satisfied in response to a difference between pixel values for each corresponding pixel of the post-printing scanned image data and the print image data in the pre-processing area is larger than a first threshold value, wherein a determination condition for an area other than the pre-processing area is satisfied in response to a difference between pixel values for each corresponding pixel of the post-printing scanned image data and the print image data in the area other than the pre-processing area is larger than a second threshold value, and wherein the first threshold value is larger than the second threshold value.

2. The image processing apparatus according to claim 1, wherein the processor is configured to: determine a difference between the post-printing scanned image data and the print image data, excluding the pre-processing area.

3. The image processing apparatus according to claim 1, wherein the processor is configured to:

specify a coordinate area including an image corresponding to the image or the pattern as a temporary pre-processing area for each of a plurality of pieces of the pre-printing scanned image data corresponding to a plurality of processing media of the same type; and specify the pre-processing area based on a plurality of temporary pre-processing areas specified in the plurality of pieces of pre-printing scanned image data.

4. The image processing apparatus according to claim 3, wherein the processor is configured to:

specify a coordinate area included in any of the plurality of specified temporary pre-processing areas as the pre-processing area.

5. The image processing apparatus according to claim 3, wherein the processor is configured to:

specify, as the pre-processing area, a coordinate area included in the temporary pre-processing area a predetermined number of times or more in specifying the temporary pre-processing area a plurality of times for the plurality of pieces of pre-printing scanned image data.

6. A non-transitory computer readable medium storing an image processing program causing a computer to execute a process comprising:

specifying, as a pre-processing area, a coordinate area in pre-printing scanned image data obtained by scanning a processing medium on which an image is printed or a pattern is applied in advance and on which print image data according to a print request is not printed, the coordinate area including an image corresponding to the image or the pattern;

comparing post-printing scanned image data obtained by scanning the processing medium on which the print image data is printed with the print image data, and determining that there is a difference between the post-printing scanned image data and the print image data in a case where a comparison result satisfies a determination condition, wherein a determination condition for the pre-processing area is satisfied in response to a difference between pixel values for each corresponding pixel of the post-printing scanned image data and the print image data in the pre-processing area is larger than a first threshold value, wherein a determination condition for an area other than the pre-processing area is satisfied in response to a difference between pixel values for each corresponding pixel of the post-printing scanned image data and the print image data in the area other than the pre-processing area is larger than a second threshold value, and wherein the first threshold value is larger than the second threshold value.

7. An image processing method comprising:

specifying, as a pre-processing area, a coordinate area in pre-printing scanned image data obtained by scanning a processing medium on which an image is printed or a pattern is applied in advance and on which print image data according to a print request is not printed, the coordinate area including an image corresponding to the image or the pattern;

comparing post-printing scanned image data obtained by scanning the processing medium on which the print image data is printed with the print image data, and determining that there is a difference between the post-printing scanned image data and the print image data in a case where a comparison result satisfies a determination condition, wherein a determination condition for the pre-processing area is satisfied in response to a difference between pixel values for each corresponding pixel of the post-printing scanned image data and the print image data in the pre-processing area is larger than a first threshold value, wherein a determination condition for an area other than the pre-processing area is satisfied in response to a difference between pixel values for each corresponding pixel of the post-printing scanned image data and the print image data in the area other than the pre-processing area is larger than a second threshold value, and wherein the first threshold value is larger than the second threshold value.

* * * * *